United States Patent
Kishimoto et al.

(10) Patent No.: US 11,257,188 B2
(45) Date of Patent: Feb. 22, 2022

(54) ULTRASONIC IMAGING DEVICE AND IMAGE PROCESSING METHOD

(71) Applicant: Hitachi, Ltd., Tokyo (JP)

(72) Inventors: Aya Kishimoto, Tokyo (JP); Nobuhiko Fujii, Tokyo (JP)

(73) Assignee: FUJIFILM HEALTHCARE CORPORATION, Chiba (JP)

( * ) Notice: Subject to any disclaimer, the term of this patent is extended or adjusted under 35 U.S.C. 154(b) by 177 days.

(21) Appl. No.: 16/695,558

(22) Filed: Nov. 26, 2019

(65) Prior Publication Data

US 2020/0226721 A1 Jul. 16, 2020

(30) Foreign Application Priority Data

Jan. 10, 2019 (JP) .............................. JP2019-002709

(51) Int. Cl.
  *G06T 5/00* (2006.01)
  *G06T 5/20* (2006.01)
  *G06T 7/30* (2017.01)
  *G01S 15/89* (2006.01)

(52) U.S. Cl.
  CPC .......... *G06T 5/002* (2013.01); *G01S 15/8965* (2013.01); *G06T 5/20* (2013.01); *G06T 7/30* (2017.01); *G06T 2207/10132* (2013.01); *G06T 2207/20036* (2013.01); *G06T 2207/20182* (2013.01)

(58) Field of Classification Search
  CPC ..... A61B 5/4312; A61B 5/6826; A61B 8/469; G06T 2207/30004; G06T 5/001
  See application file for complete search history.

(56) References Cited

U.S. PATENT DOCUMENTS

| | | | | |
|---|---|---|---|---|
| 6,983,662 B2 * | 1/2006 | McLaughlin | ........ | A61B 5/0285 73/861.42 |
| 7,302,092 B1 * | 11/2007 | Fenster | ............... | G01S 7/52034 382/128 |
| 7,480,363 B2 * | 1/2009 | Lasiuk | ................. | G01B 15/025 378/54 |
| 7,496,619 B2 * | 2/2009 | Aldroubi | ................. | G06T 5/001 708/446 |

(Continued)

FOREIGN PATENT DOCUMENTS

JP 2005-205199 A 8/2005

OTHER PUBLICATIONS

Masayoshi Tsubai, et al., "Gray Scale Morphology Using Double Structuring Elements and Their Application to Contrast Enhancement for Ultrasound Images", IEEJ Trans. EIS, vol. 124, No. 9, 2004.

*Primary Examiner* — Yosef Kassa
(74) *Attorney, Agent, or Firm* — Mattingly & Malur, PC

(57) ABSTRACT

Provided is a technique capable of simultaneously satisfying two requests of removing a speckle and clarifying a tissue structure. A noise in an ultrasonic image is removed, and a morphology processing is performed on a noise-removed image. The morphology processing includes a first calculation of performing dilation and erosion and a second calculation of performing opening and closing, and determines a value of a structural element used in the second calculation of the morphology by using a result of the first calculation performed on the noise-removed image.

19 Claims, 11 Drawing Sheets

(56) References Cited

U.S. PATENT DOCUMENTS

| | | | | |
|---|---|---|---|---|
| 7,611,466 B2* | 11/2009 | Chalana | ............... | A61B 8/0858 |
| | | | | 382/128 |
| 8,045,770 B2* | 10/2011 | Reeves | ................. | G06T 7/0012 |
| | | | | 382/128 |
| 8,175,350 B2* | 5/2012 | Suri | ..................... | G06K 9/3233 |
| | | | | 382/128 |
| 8,334,616 B2* | 12/2012 | Mansoor | ................ | H02M 1/10 |
| | | | | 307/80 |
| 8,345,940 B2* | 1/2013 | Mattiuzzi | ............. | G06T 7/0012 |
| | | | | 382/128 |
| 8,427,477 B2* | 4/2013 | Brabec | ................. | G06T 11/206 |
| | | | | 345/440 |

* cited by examiner

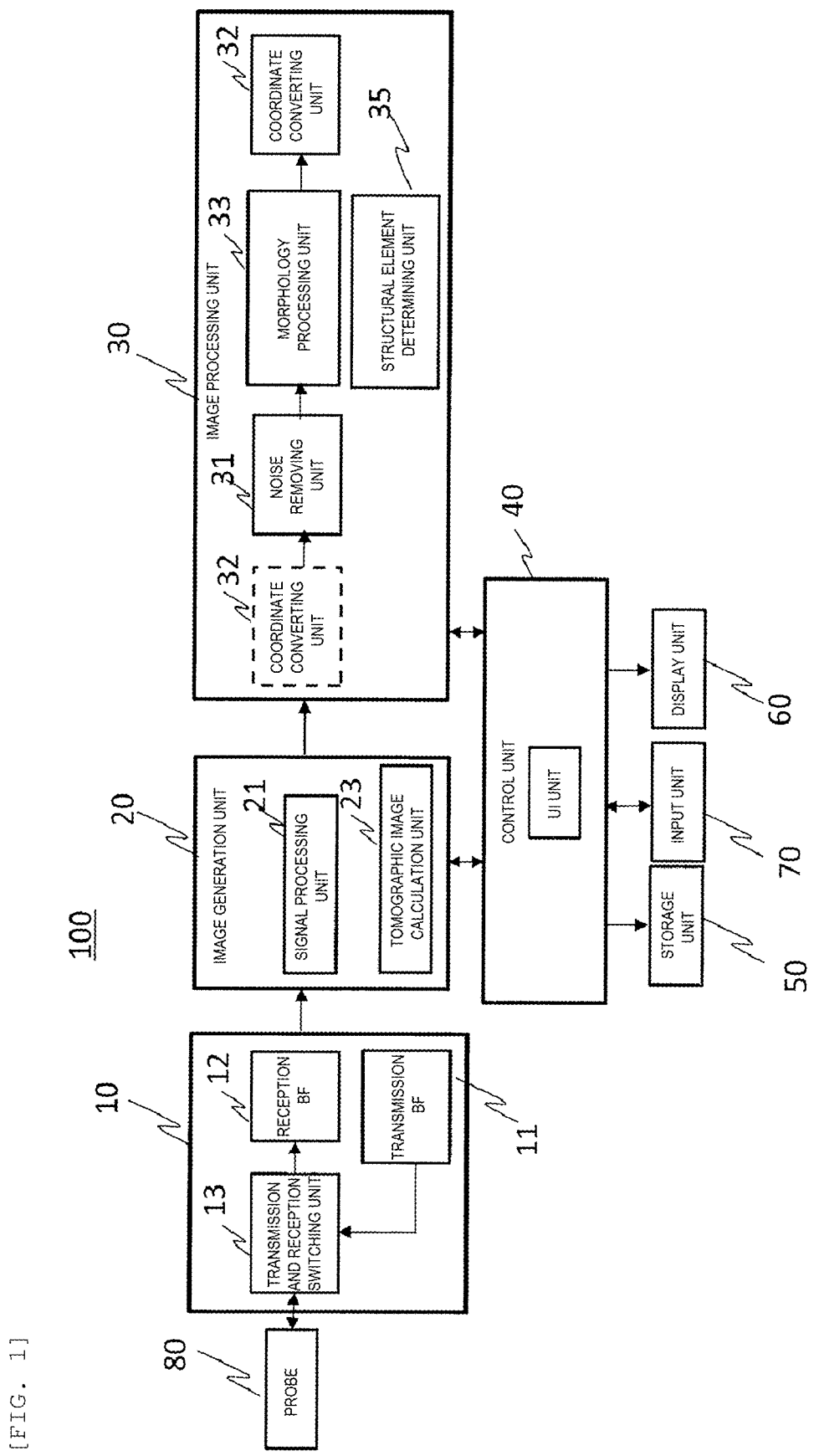
[FIG. 1]

[FIG. 2]
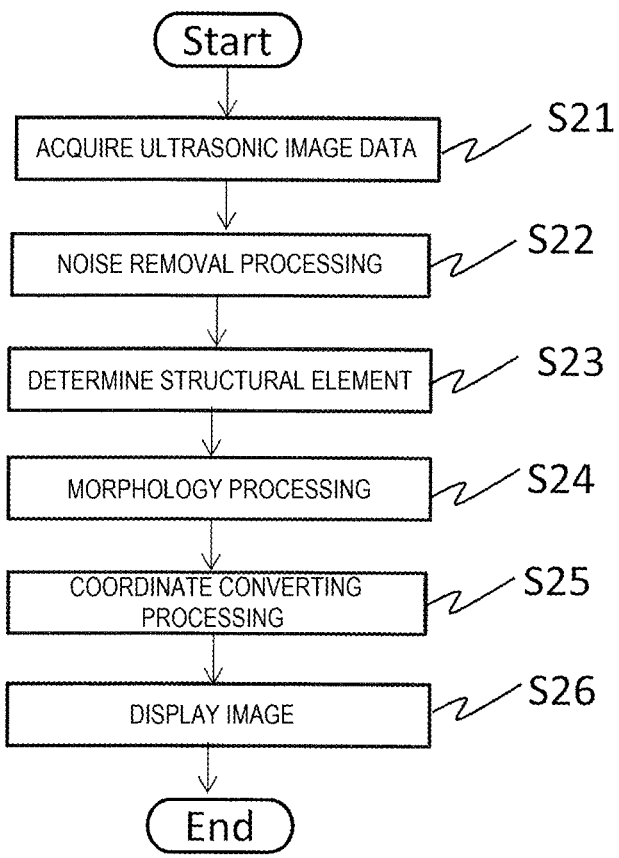

[FIG. 3]
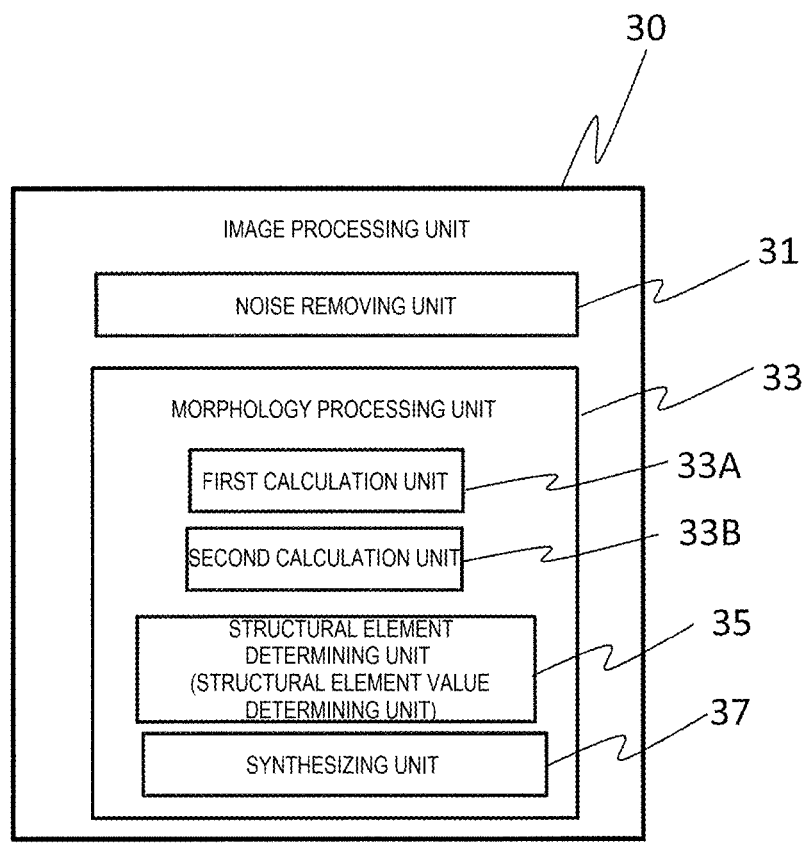

[FIG. 4]
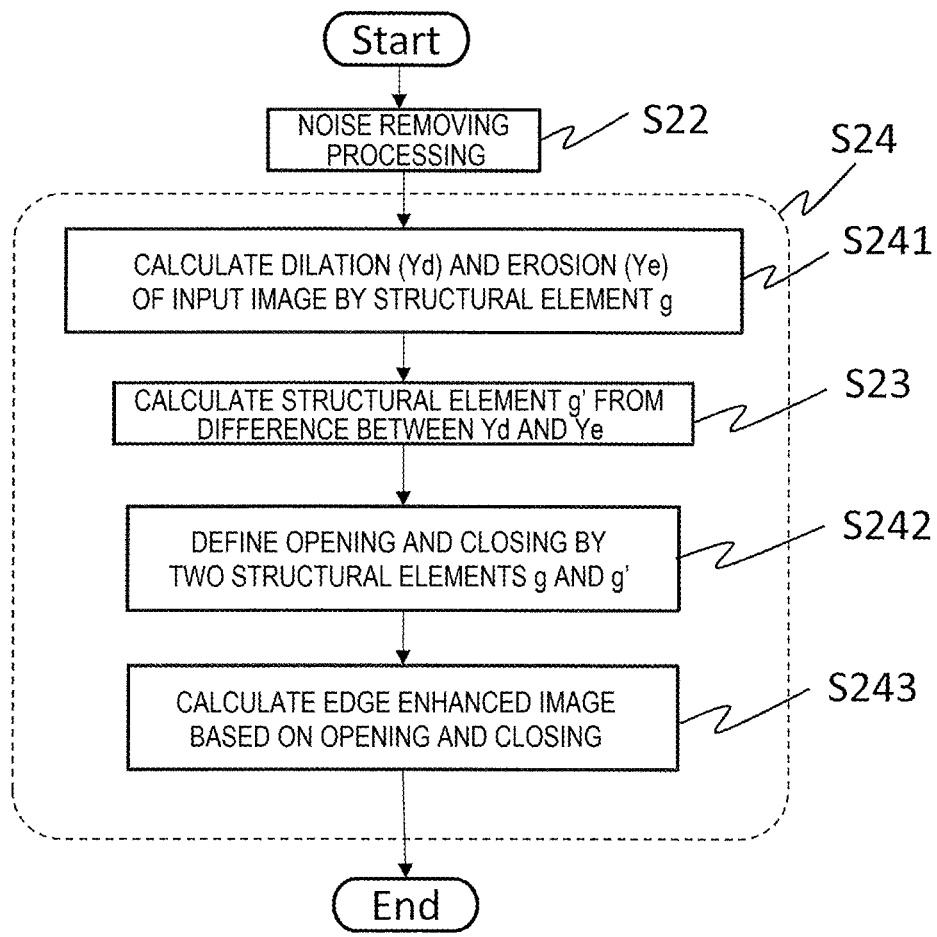

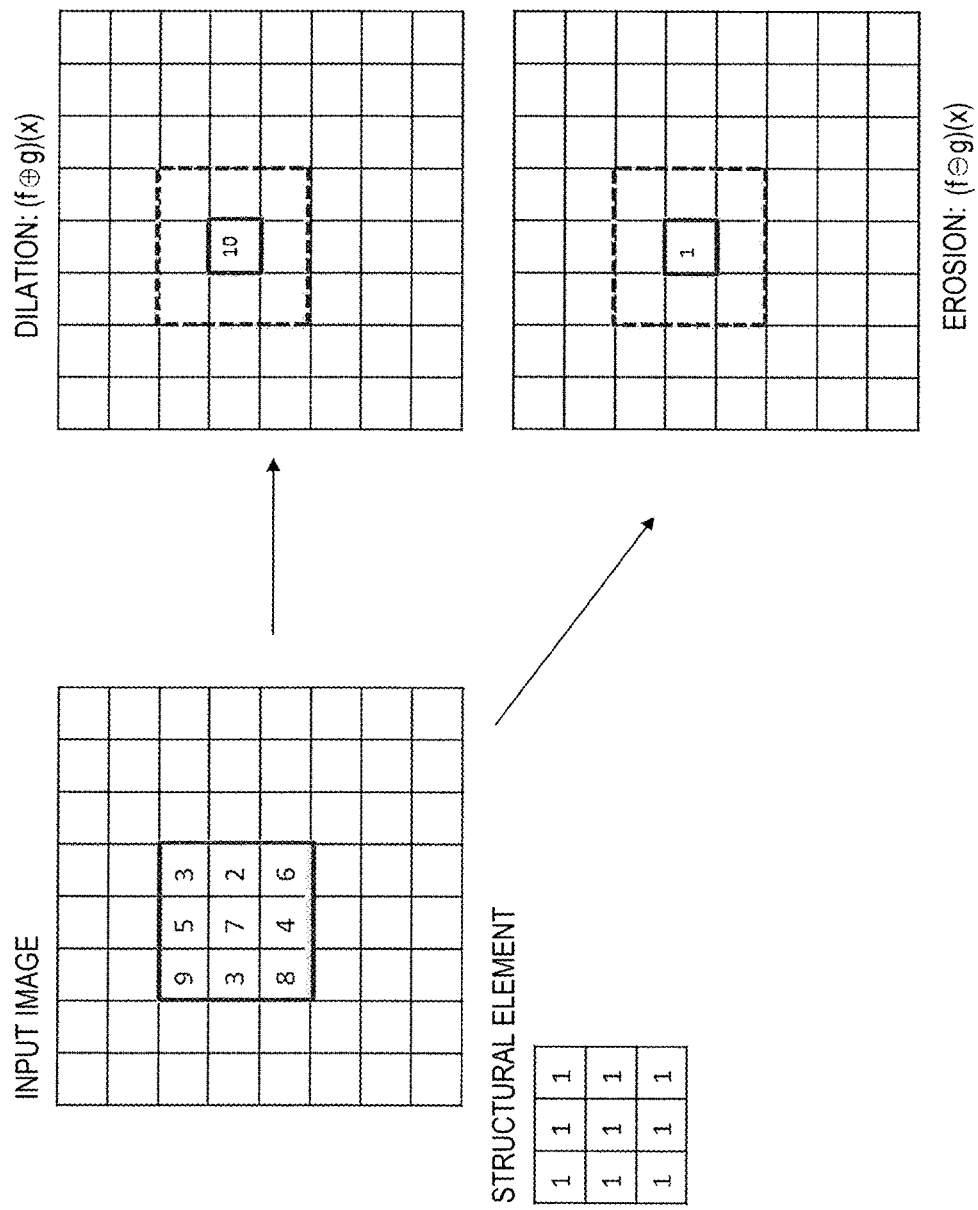
[FIG. 5]

[FIG. 6A]
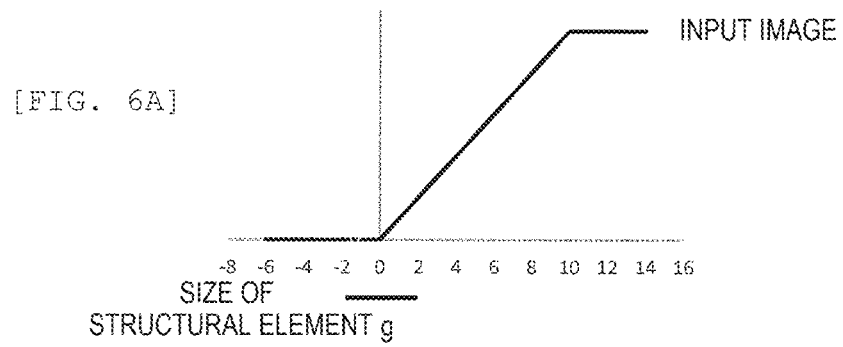
[FIG. 6B]
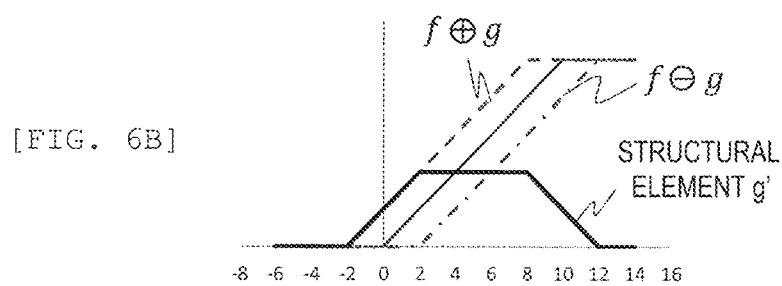
[FIG. 6C]
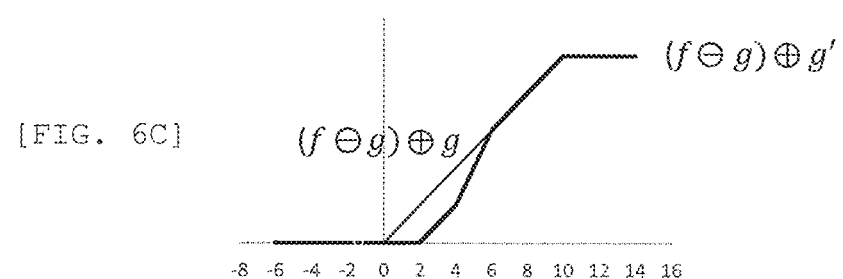
[FIG. 6D]
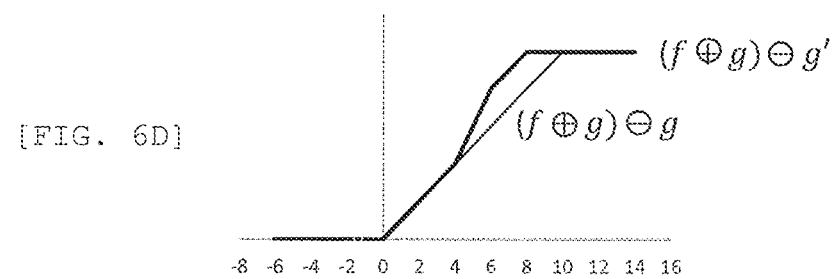
[FIG. 6E]
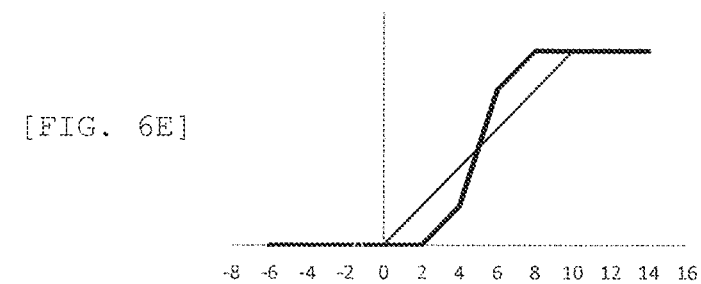

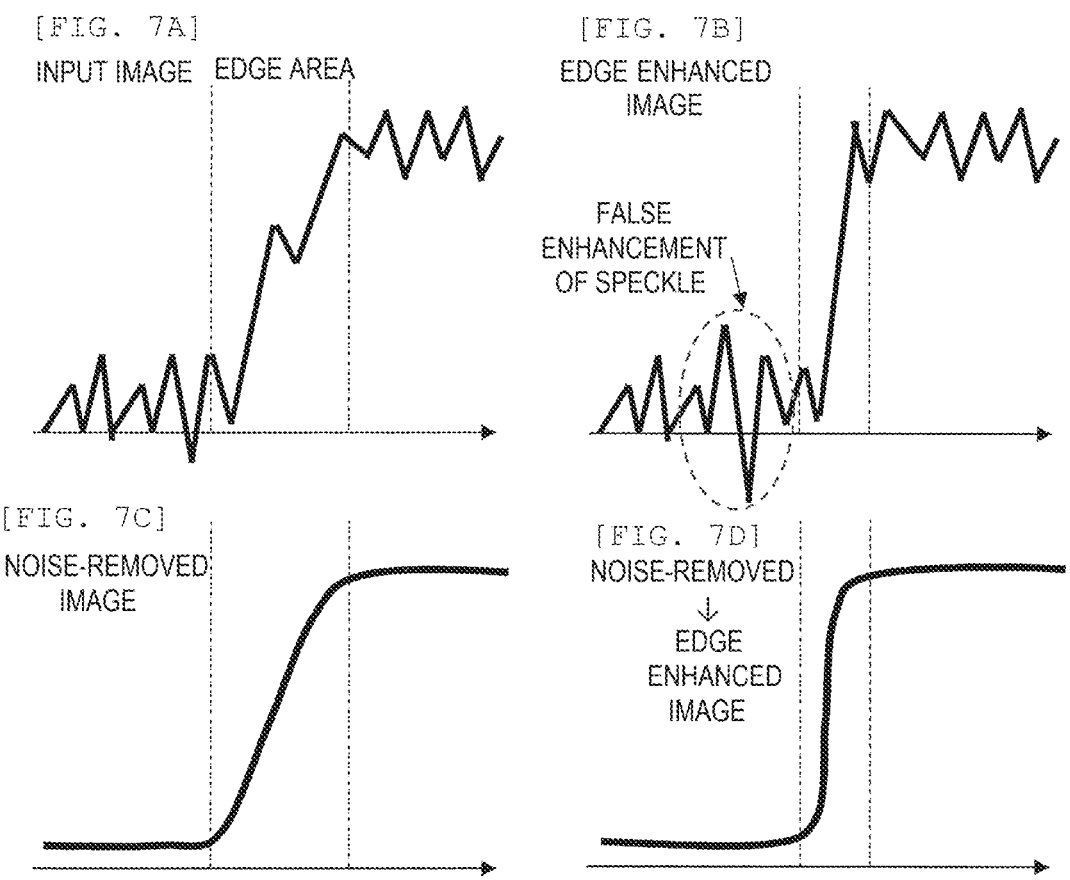
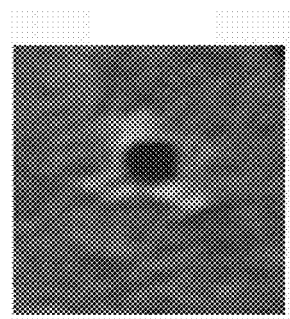
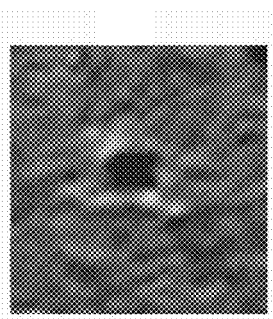

[FIG. 9]
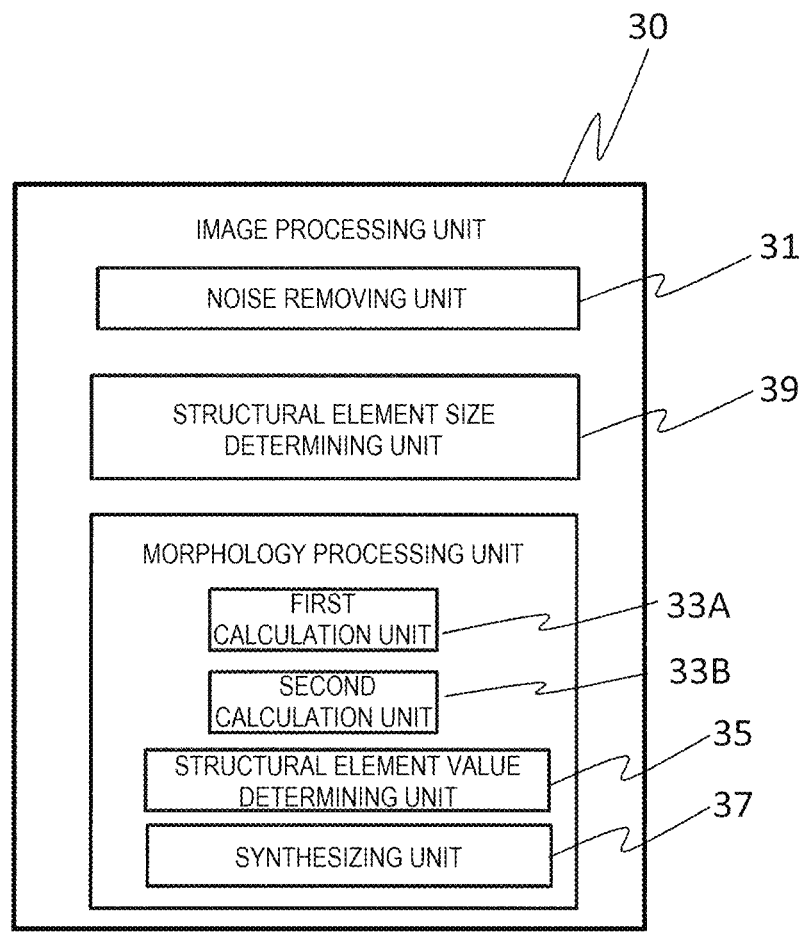

[FIG. 10]
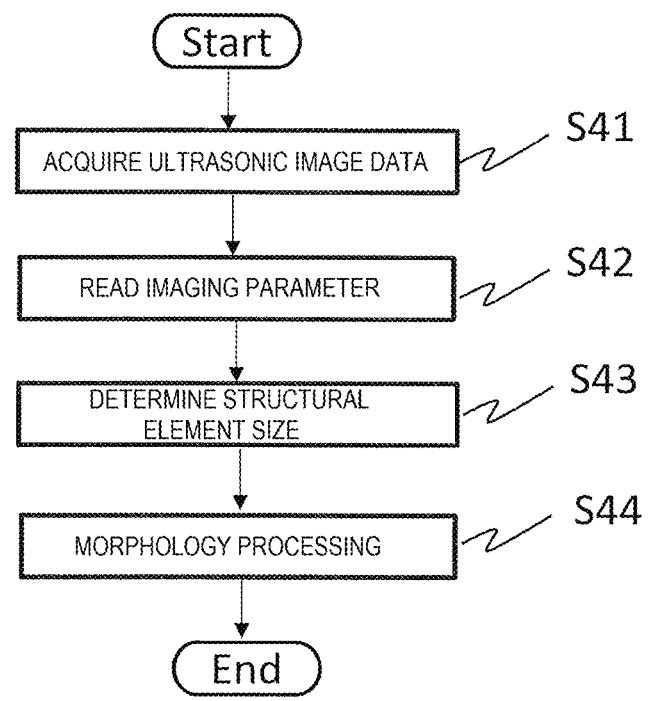

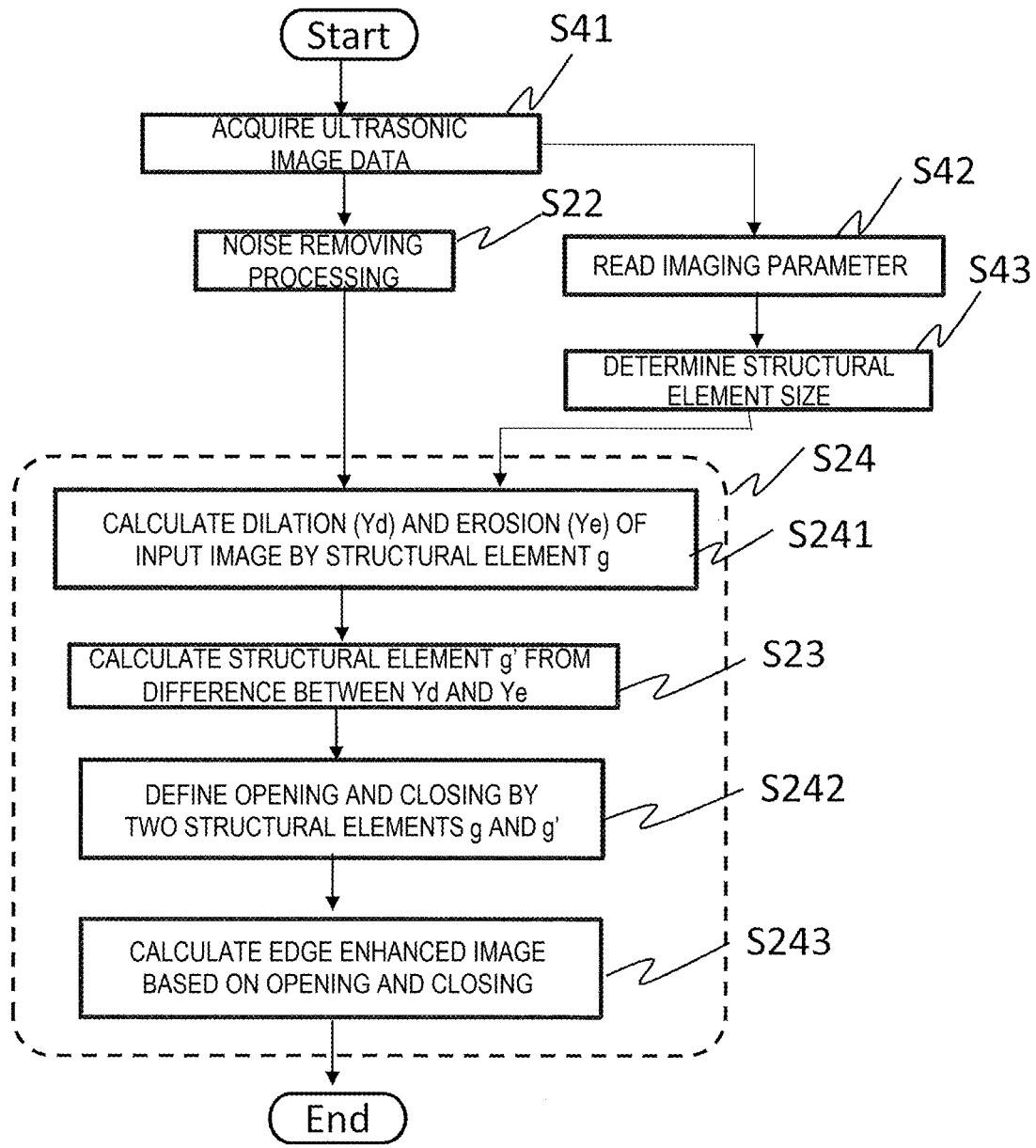
[FIG. 11]

[FIG. 12]
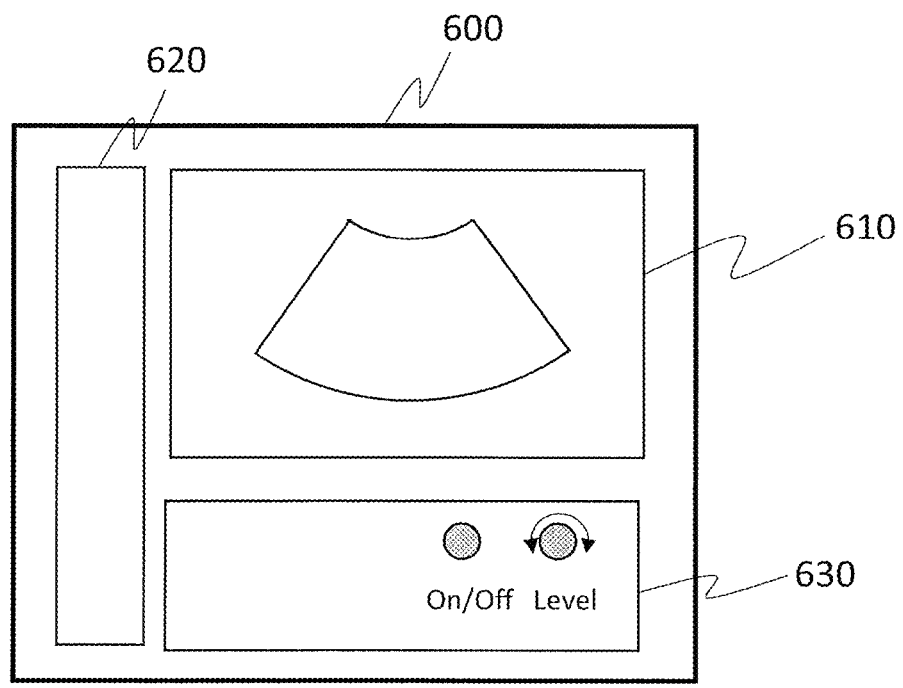

ULTRASONIC IMAGING DEVICE AND IMAGE PROCESSING METHOD

CROSS-REFERENCE TO RELATED APPLICATION

The present application claims priority from Japanese application JP2019-002709 filed on Jan. 10, 2019, the contents of which is hereby incorporated by reference into this application.

TECHNICAL FIELD

The present invention relates to an ultrasonic imaging device, and particularly relates to an image processing for an ultrasonic image obtained by the ultrasonic imaging device.

BACKGROUND ART

An ultrasonic imaging device is a device capable of acquiring and displaying an image of an inspection object in a simple and real time manner, which is widely used in the medical field and the like. However, compared to a medical imaging device such as a CT device, an image obtained by ultrasonic imaging is low in resolution and is likely to cause a difference in identification or diagnosis of a structure of an inspection object depending on skills of an inspector. Further, a reason that causes image quality of an ultrasonic image to deteriorate includes a noise which is referred to as a speckle generated by interference between reception signals of ultrasonic. Sizes or shapes of speckles are different in an image, the larger the depth is, the slender the shape is, and the size of a speckle may also be equal to a structure of a living body. Accordingly, it is difficult to remove the speckles by a noise removing technique such as a normal filtering processing. Therefore, the speckles may remain in the image and be difficult to be distinguished from a tissue structure.

As a technique for improving image quality of such an ultrasonic image, NPL 1 and PTL 1 disclose a technique using a morphology technique. In the morphology, four pieces of processing of dilation (expansion processing), erosion (reduction processing), opening processing, and closing processing are combined to process an original image, so that an edge that is a boundary of a structure can be enhanced. Opening is processing of dilating an image after erosion, and closing is processing of performing erosion on an image after dilation. In such processing, a function which is referred to as a structural element is used to determine a pixel value of an image which is a processing object by using pixel values of surrounding pixels. A size of the structural element is a size of an area including surrounding pixels centering on a pixel which is the processing object. By applying an appropriate size and value to each pixel of an original image and performing dilation or erosion, a desired edge enhancement effect can be obtained.

NPL 1 discloses a technique of varying a structural element used in opening or closing processing after dilation or erosion according to a position of an ultrasonic image when the above-described morphology technique is applied to the ultrasonic image. Specifically, a value of the structural element is changed according to whether a position of the image which is a processing object is in an edge area or in a uniform area. Accordingly, a high edge enhancement effect is achieved. When determining the value of the structural element, luminance dispersion information in the structural element is used flexibly by utilizing a fact that luminance dispersion tends to be larger in a tissue boundary (edge area) compared to other areas.

PTL 1 discloses a method of performing dilation by multiplying a weighting coefficient of a first group which is set according to a position in a mask area and performing erosion by multiplying a weighting coefficient of a second group according to a result of the dilation, so as to perform an image processing that hardly causes artifacts when a speckle reduction processing is performed. This technique is a method of multiplying an input image by a weighting coefficient, and a value of a structural element remains the same regardless of the position in the image.

PRIOR ART LITERATURE

Non-Patent Literature

NPL 1: IEEJTrans. IEIS, TSUBAKII MASAYOSHI et al "morphological operations using double structuring elements and application to edge sharpening of ultrasonic images", Vol. 124, No. 9, 2004

PATENT LITERATURE

PTL 1: JP-A-2005-205199

SUMMARY OF INVENTION

Technical Problem

Although the technique disclosed in NPL 1 can achieve high edge enhancement and can effectively remove a speckle noise in a smoothing portion by changing the value of the structural element used in the opening or the closing according to a position of a pixel, an edge of the speckle may be enhanced and a smoothing effect may be limited when the structure and the speckle are not sufficiently distinguished from each other.

An edge enhancement effect obtained by the technique disclosed in PTL 1 is limited since the same processing is performed regardless of whether it is in the edge area or in the uniform area.

An object of the invention is to provide a technique capable of simultaneously satisfying two requests of removing a speckle and clarifying a tissue structure by adaptively determining a value of a structural element based on an image from which a noise is removed.

Solution to Problem

In order to solve the above problems, the invention provides an ultrasonic imaging device to perform a noise processing on an ultrasonic image, and perform a morphology processing on an image after the noise processing by using a structural element whose value is determined based on a dilation result and an erosion result of the image.

That is, the ultrasonic imaging device according to the invention includes: an ultrasonic measurement unit that transmits ultrasonic to an inspection object, receives ultrasonic which is a reflected wave, and acquires an ultrasonic signal; an image generation unit that generates an ultrasonic image of the inspection object using the ultrasonic signal acquired by the ultrasonic measurement unit; and an image processing unit that processes the ultrasonic image created by the image generation unit. The image processing unit includes a noise removing unit that removes a noise of the ultrasonic image, a morphology processing unit that performs a morphology processing on a noise-removed image generated by the noise removing unit, and a structural element determining unit that determines a value of a structural element used in the morphology processing by using the noise-removed image.

Further, the invention provides an image processing method for processing an ultrasonic image generated by using an ultrasonic signal received by an ultrasonic imaging device. The image processing method includes: removing a noise of the ultrasonic image; performing a morphology processing on a noise-removed image; and determining a value of a structural element used in the morphology processing by using the noise-removed image.

Advantageous Effect

According to the invention, it is possible to perform processing of differentiating a characteristic of a structure in an ultrasonic image and a noise unique to the ultrasonic image, and to obtain an ultrasonic image in which a noise is reduced and a structure of an inspection object is clarified.

BRIEF DESCRIPTION OF DRAWINGS

FIG. 1 is a diagram showing an overall configuration of an ultrasonic imaging device according to an embodiment.

FIG. 2 is a flowchart showing a scheme of an image processing.

FIG. 3 is a block diagram showing a configuration of an image processing unit of an ultrasonic imaging device according to a first embodiment.

FIG. 4 is a flowchart showing processing of the image processing unit according to the first embodiment.

FIG. 5 is a diagram showing a morphology processing.

FIGS. 6A to 6E are diagrams showing results of the image processing.

FIGS. 7A to 7D are diagrams showing effects of the first embodiment.

FIG. 8A shows a processing result according to the first embodiment and FIG. 8B shows a processing result according to a method in the related art.

FIG. 9 is a block diagram showing a configuration of an image processing unit of an ultrasonic imaging device according to a second embodiment.

FIG. 10 is a flowchart showing a scheme of an image processing according to the second embodiment.

FIG. 11 is a flowchart showing processing of the image processing unit according to the second embodiment.

FIG. 12 is a diagram showing an example of a UI of an ultrasonic imaging device according to a third embodiment.

DESCRIPTION OF EMBODIMENTS

Hereinafter, embodiments of an ultrasonic imaging device and an image processing method according to the invention will be described with reference to the drawings.

First, the ultrasonic imaging device to which the invention is applied will be briefly described. As shown in FIG. 1, as a main configuration, an ultrasonic imaging device 100 includes an ultrasonic measurement unit 10 that transmits ultrasonic to an inspection object, receives ultrasonic which is a reflected wave, and acquires an ultrasonic signal, an image generation unit 20 that generates an ultrasonic image of the inspection object using the ultrasonic signal acquired by the ultrasonic measurement unit 10, and an image processing unit 30 that processes the ultrasonic image created by the image generation unit 20. As an auxiliary device, the ultrasonic imaging device 100 further includes an ultrasonic probe 80 that contacts the inspection object and transmits and receives the ultrasonic. The ultrasonic imaging device 100 further includes a control unit 40 that controls operation of each unit of the device, an input unit 70 for an user to input a measurement condition or an instruction such as starting or stopping a measurement, a storage unit 50 that stores an image generated by the image generation unit 20 or the image processing unit 30, data necessary for calculation of the image processing unit 30, and the like, a display unit 60 that displays an image, a Graphic User Interface (GUI), and the like, a scan converter (not shown), and the like.

A configuration of the ultrasonic measurement unit 10 is similar to a configuration of a known ultrasonic imaging device. In order to transmit ultrasonic of a predetermined frequency from the ultrasonic probe 80 to an internal area of interest of the inspection object, the ultrasonic measurement unit 10 includes a transmission BF unit 11 that performs beam forming of a transmission signal, a reception BF unit 12 that receives an ultrasonic signal which is a reflected wave from the internal area of the inspection object and performs processing such as amplification and phasing, and a transmission and reception switching unit 13 that switches transmission and reception, and the like. Some of these elements may be provided inside the ultrasonic probe 80 (probe).

The image generation unit 20 receives an ultrasonic signal from the reception BF unit 12, performs luminance conversion, frequency analysis, and the like, and generates an image to be displayed on the display unit 60. The image generation unit 20 includes a signal processing unit 21 and a tomographic image calculation unit 23 that generates image data such as a B mode image.

The image processing unit 30 performs processing such as noise removal or edge enhancement on an image (a tomographic image) generated by the image generation unit 20 and generates an image after an image processing. The image processing unit 30 includes a noise removing unit 31 that removes a noise in an ultrasonic image, a morphology processing unit 33 that performs a morphology processing on a noise-removed image generated by the noise removing unit 31, a coordinate converting unit 32 that converts coordinates of image data. Further, the image processing unit 30 according to the present embodiments includes a structural element determining unit 35 that determines a value of a structural element used in the morphology processing by using the noise-removed image. The coordinate converting unit 32 converts coordinates of an image from polar coordinates (r-θ coordinates) in which a vertical axis is a depth direction r of an ultrasonic beam and a horizontal axis is an angle direction θ into coordinates (x-y Cartesian coordinates) in a real space. The coordinate converting unit 32 may be a previous stage of the noise removing unit 31 or a subsequent stage of the morphology processing unit 33.

Although main functions of the control unit 40 and the image processing unit 30 in the above-described ultrasonic imaging device can be implemented by a computer including a CPU or a GPU and a memory, some or all functions of the image processing unit 30 can be implemented by another computer different from the ultrasonic imaging device, and such an embodiment is also included in the invention. Further, a part of functions which are implemented by software of a computer may be implemented by hardware such as an ASIC or an FPGA.

FIG. 2 shows a scheme of processing in the ultrasonic imaging device configured as above. As shown in FIG. 2, when the reception BF unit 12 receives an ultrasonic signal via the ultrasonic probe 80, the image generation unit 20 stores a signal of one frame in a memory as image data (S21). Image data of one or a plurality of frames is stored in the memory, and the memory is updated whenever the frame is updated.

When the image data of each frame is input into the image processing unit 30, the image processing unit 30 performs a noise removing processing on the input image data (S22), and performs a morphology processing using an adaptive structural element whose structural element value is determined based on the noise-removed image (S23 and S24). The adaptive structural element is a structural element that is applied when at least one of a value and a size of the structural element changes according to a pixel position of an image which is a processing object. An image having a clear tissue structure without a false enhancement of a speckle may be obtained by performing such a morphology processing. After coordinates of the image data after the morphology processing are converted into real space coordinates (x-y coordinates) by the coordinate converting unit 32 (S25), the image data is converted into a display image by a scan converter 70 and is displayed on the display unit 60 together with accompanying information such as an imaging condition and target object information (S26).

Although the step S23 of determining the structural element is shown in a previous stage of the morphology processing S25 in FIG. 2, the step S23 may be performed during the morphology processing S24. Although FIG. 2 shows a case where the image coordinate converting processing S25 is performed after the morphology processing, the image converting processing S25 may be performed before a noise processing or may be performed before the noise processing and after the morphology processing.

Hereinafter, embodiments for the configuration of the image processing unit 30 and the image processing method will be described based on the configuration and operation of the above-described ultrasonic imaging device.

First Embodiment

In the present embodiment, the structural element determining unit 35 determines the value of the structural element using a result of a first calculation of morphology. In the image processing unit 30 according to the present embodiment, as shown in FIG. 3, the morphology processing unit 33 includes a first calculation unit 33A that performs at least one of dilation and erosion using a first structural element, and a second calculation unit 33B that performs at least one of opening and closing using a second structural element. The structural element determining unit 35 uses the noise-removed image to determine a value of the second structural element used in the second computing unit 33B. In the present embodiment, the structural element determining unit 35 is referred to as a structural element value determining unit. The morphology processing unit 33 further includes a synthesizing unit 37 that generates an output image of the morphology processing using processing results of the first calculation unit 33A and the second calculation unit 33B. The coordinate converting unit 32 is omitted in FIG. 3.

As shown in FIG. 4, the image processing unit 30 in the present embodiment sequentially performs receiving image data generated by the image generation unit 20, the noise processing (S22), a first calculation of the morphology processing (S241), determining the structural element (S23), a second calculation of the morphology processing (S242), and a synthesizing processing (S243). In the morphology processing, the structural element is adaptively set for an image, and four pieces of processing which are the dilation and the erosion in the first calculation and the opening and the closing in the second calculation are performed. In the step of determining the structural element, the structural element used in the second calculation is determined.

Hereinafter, processing in the image processing unit 30 will be described in detail.

[Noise Removing Processing: S22]

Noise removal is performed on image data (an original image) using a predetermined filter. An example of a noise removal filter preferably includes an edge-preserving smoothing filter that performs noise removal and prevents blurring of an edge area at the same time. Specifically, a weighted average filter which weights and averages a pixel value in a local area centering on a target pixel by increasing a weighting coefficient of the target pixel, a direction dependent filter which detects a direction component of a structure such as an edge and performs a one-dimensional smoothing processing in the direction of the structure, a multi-resolution analysis which expands input image data with a scaling function and expands a result thereof into a wavelet function of different resolutions, and the like can be adopted, and the multi-resolution analysis is particularly preferable.

[Morphology Processing (First Calculation): S241]

The dilation and the erosion are performed on the image data after the noise removal (noise-removed image). A structural element having a fixed value and a constant size is used in this processing. The processing details are similar to the known dilation and erosion, and can be expressed by equations (1) and (2), respectively.

[Formula 1]

$$(f \oplus g)(x) = \max_{x-u \in F, u \in G}\{f(x-u) + g(u)\} \quad (1)$$

$$(f \ominus g)(x) = \min_{x-u \in F, u \in G}\{f(x-u) - g(u)\} \quad (2)$$

In the formula, f refers to image data which is input data, x refers to a position in the image data, g refers to a structural element, and u refers to a position of the structural element. Reference numerals "+" and "−" within a circle are operators respectively referring to the dilation processing and the erosion processing of the image data f using the structural element g.

That is, as shown in FIG. 5, for example, the structural element g (FIG. 5 shows that the size is 3×3 and the value is 1) having a fixed value acts on each pixel of the input image f, and a pixel value of the pixel which is a processing object is determined by the equations (1) and (2). Accordingly, the value of the structural element of a corresponding pixel is added in the dilation and a maximum value is set as the pixel value of the pixel which is a processing object, and the value of the structural element of a corresponding pixel is subtracted in the erosion and a minimum value is set as the pixel value of the pixel which is a processing object. For example, when the input image is shown by a one-dimensional graph as shown in FIG. 6A, a dilation result is shown by a dotted line in FIG. 6B, and an erosion result is shown by alternate long and short dashed lines. The size of the structural element g is shown at the bottom of FIG. 6A.

[Determining Structural Element: S23]

The structural element value determining unit 35 uses the result of the first calculation described above to determine the structural element used in the following second calculation. The structural element in the second calculation is an adaptive structural element whose value varies according to the position of the pixel which is a processing object, and the value of the structural element is determined to be large in an edge area and is small in a uniform area. Therefore, a result (output) Yd of the dilation and a result (output) Ye of the erosion in step S241 are different.

[Formula 2]

$$g' = Yd - Ye \quad (3)$$

As a result, as shown by a thick line in FIG. 6B, a value of the difference is large in an area where the pixel value changes significantly, that is, in the edge area, and is small in the uniform area. In the present embodiment, a structural element g' whose structural element value is a value of a function which is the difference is determined. The size of the structural element may be the same as or different from the structural element in the first calculation.

[Morphology Processing (Second Calculation): S242]

The closing processing and the opening processing are respectively performed on the dilation result and the erosion result in step S241 by using the structural element g' determined in step S23. The opening is the dilation processing after the erosion, and the closing is the erosion processing after the dilation, and the opening and the closing can be expressed by equations (4) and (5) by using operators referring to the dilation and the erosion.

[Formula 3]

$$f \circ (g, g') = f \ominus g \oplus g' \quad (4)$$

$$f \bullet (g, g') = f \oplus g \ominus g' \quad (5)$$

In an example shown in FIG. 6B, results of the opening and the closing are shown in FIGS. 6C and 6D, respectively. As shown in the drawings, it can be seen that edges are enhanced more sharply at both sides of a boundary area, respectively, than the original image by such processing. In the present embodiment, in addition to the opening and the closing using the adaptive structural element g', the opening and the closing using the structural element g used in the first calculation are performed. Results thereof can be used in the following synthesizing processing.

[Synthesizing Processing: S243]

Finally, the synthesizing unit 37 synthesizes a processing result in step S242 and the input image according to equation (6).

[Formula 4]

$$f_{out} = f + f \circ (g, g') - f \circ g + f \bullet (g, g') - f \bullet g \quad (6)$$

A synthesized result is shown in FIG. 6E.

In this example, a difference between an opening result using the adaptive structural element g' and an opening result using the structural element g, and a difference between a closing result using the adaptive structural element g' and a closing result using the structural element g are added to the input image to form an output image. Accordingly, it is possible to obtain an image in which an edge enhanced effect is improved and a noise is smoothed.

However, a synthesizing method is not limited to the equation (6), and, for example, only the difference between the opening result using the adaptive structural element g' and the opening result using the structural element g, or the difference between the closing result using the structural element g' and the closing result using the structural element g may be added to the input image. Instead of adding the difference, the opening result and the closing result using the adaptive structural element g' may also be added.

The processing (S23 and S24 in FIG. 2) in the image processing unit 30 based on steps S241 to S243 described above is completed. A synthesized image is displayed as an output image on the display unit 60. Alternatively, the synthesized image is stored in the storage unit 50.

An effect of the present embodiment will be described with reference to FIGS. 7A and 7B. FIG. 7A is a diagram schematically showing an input image. When edge enhancement is performed by directly applying the morphology processing to the input image, as shown in FIG. 7B, although an edge part is enhanced, a speckle in the uniform portion (flat part) may also be enhanced at the same time when there is a speckle that is not applicable to the structural element. Therefore, even if smoothing such as noise removal is performed thereafter, a false enhanced speckle remains and cannot be distinguished from a boundary or the like of a tissue. In contrast, as shown in FIGS. 7C and 7D, the morphology processing is performed based on an image (FIG. 7C) after the noise removing processing, and accordingly an image (FIG. 7D) with an enhanced edge which should be enhanced primarily can be obtained in the present embodiment.

With regard to an image actually acquired by the ultrasonic imaging device, FIGS. 8A and 8B show an image (FIG. 8A) on which the processing according to the present embodiment is performed and an image (FIG. 8B) on which the noise removing processing is not performed and the morphology processing is performed. It can be seen from FIGS. 8A and 8B that a central tissue can be clearly distinguished from a surrounding tissue in an image from which the speckle is removed by performing the processing according to the present embodiment.

As described above, according to the present embodiment, it is possible to implement sufficient noise removal in the uniform area and obtain a high edge enhancement effect in the edge area by performing the morphology processing using the adaptive structural element on the image after the noise removal processing is performed on the original image. Accordingly, deterioration in image quality caused by speckle noise can be prevented.

Second Embodiment

In the first embodiment, the value of the adaptive structural element used in the morphology is determined using the first calculation result of the morphology. However, the second embodiment determines and uses a structural element whose size varies according to a position.

Since the morphology processing generally has an effect of smoothing a component in a structural element, it is desirable to set a size of the structural element to a size corresponding to the size of a speckle. The size of the speckle is different in each image depending on a type of an ultrasonic probe used for imaging, a frequency of an ultrasonic signal, an imaging condition, and the like. Since the size of the speckle varies depending on a depth, a sampling interval, or the like, the size of the speckle varies even in the same image depending on a position. In the second embodiment, the speckle noise is effectively removed by determining the size of the structural element according to an imaging condition.

A configuration of an image processing unit in the second embodiment is basically the same as the configuration of the image processing unit in the first embodiment, and a size determining unit 39 is added as shown in FIG. 9. In FIG. 9, the same elements as those in FIG. 3 are denoted by the same reference numerals, and repetitive descriptions thereof will be omitted. In FIG. 9, the coordinate converting unit 32 is omitted.

As shown in FIG. 10, the image processing unit 30 according to the second embodiment acquires ultrasonic image data (S41), then acquires information (for example, imaging parameters) necessary for determining the size of the structural element used in the subsequent morphology processing (S42), and determines the size (S43). Thereafter, a noise removing processing, a morphology processing (a first calculation and a second calculation) (S44), and an image converting processing are performed.

Hereinafter, processing of the size determining unit 39 which is a feature of the second embodiment will be described. When the image data is received, the size determining unit 39 acquires information related to a resolution and a sampling interval of the image from imaging conditions or the like obtained when the image data is acquired. The resolution of the image varies depending on a depth and an orientation which are determined according to conditions such as an ultrasonic probe, a frequency, a focus position, and an imaging mode. The resolution can be obtained from the depth determined by parameters of the image by obtaining a relationship between the depth and the resolution in advance by calculation of a sound field numerical value, an image simulation, an actual measurement, or the like for each type of the ultrasonic probe and each imaging condition. The relationship between the depth and the resolution is preferably stored in the storage unit 50 as, for example, a table LUT, and the resolution corresponding to the acquired depth is obtained with reference to the LUT.

The sampling interval is a real-space distance between adjacent data on the input image (in an r-θ coordinate system or an x-y coordinate system), and information of the sampling interval can be obtained directly from the input image. For example, when the input image is in the r-θ coordinate system (before coordinate conversion) and the data interval on the input image in a θ direction is 1 degree, the sampling interval Δs in the θ direction at r=30 mm is Δs=30 [mm]×(1/180×π)=0.5 [mm].

When the resolution is R and the sampling interval is Δs, the size determining unit 39 determines a size N of the structural element by, for example, the following equation (7).

$$N = R/\Delta s \qquad (7)$$

Since the resolution R varies according to the position of a pixel, the size may change according to the pixel position. The size of the structural element may also be determined as any of calculated statistical values such as a maximum value, a minimum value, or an average value of "R/Δs" acquired for all pixels. Alternatively, all of the pixels may be divided into a plurality of groups according to the value of "R/Δs", an average value or the like of the "R/Δs" (=N) in each group may be calculated, and the average value may be the size N of the structural element applied to each group. The maximum value or the minimum value may be applied instead of the average value.

The determined structural element size can be applied to the structural element used in both the first calculation and the second calculation of the morphology processing. The calculation of the morphology is similar to the calculation of the morphology in the first embodiment. The first calculation unit 33A of the morphology processing uses the structural element whose size is determined by the size determining unit 39 to perform dilation and erosion on a noise-removed image. Then, the second calculation unit 33B uses the structural element whose size is determined by the size determining unit 39 to perform opening and closing. Finally, an opening and closing result and the input image are synthesized by the above-described equation (6).

Alternatively, when the processing of determining the structural element (S23) in the first embodiment is not performed, with respect to the dilation result Yd and the erosion result Ye of the first calculation, one of the Yd and the Ye which is closer to the original image may be weighted and selected for each pixel and then synthesizing may be performed.

The value of the structural element used in each calculation may be a fixed value or the fixed value may vary according to the position. When the image processing unit 30 in the second embodiment includes the structural element determining unit 35 that is the same as the structural element determining unit 35 of the image processing unit 30 in the first embodiment, as shown in FIG. 11, the image processing unit 30 may use a difference between the dilation result Yd and the erosion result Ye in the first calculation of the morphology processing (S241) to determine the structure element g' whose value changes according to the position of the image (S23), and use such an adaptive structural element g' to perform the second calculation (S242). In this case, as shown in equation (6), a difference between the opening result using the same structural element g as in the first calculation and the opening result using the adaptive structural element g', and a difference between the closing result using the same structural element g as in the first calculation and the closing result using the adaptive structural element g' are separately added to the noise-removed image to create a final image.

In the second embodiment, the processing of converting image coordinates may also be before or after the morphology processing. However, when image conversion is performed after the morphology processing, the resolution that determines the size of the structural element uses a value of a resolution in the r-θ coordinates.

According to the second embodiment, an effect in which the edge enhancement that prevents the false enhancement of the speckle and the smoothing can be achieved by performing the morphology processing on the noise-removed image, which is similar to the first embodiment. In addition, by using a structural element having a size corresponding to the size of the speckle in the morphology processing, it is possible to appropriately perform the edge enhancement in the edge area and the smoothing in the uniform area by minimizing an influence of a speckle noise and to obtain an image with good image quality.

Further, according to the second embodiment, when the adaptive structural element (the structural element whose value changes according to the position) according to the first embodiment is further used, the edge enhancement effect in the edge area and the smoothing in the uniform area can be further improved. However, the second embodiment also includes a case where such an adaptive structural element is not used.

In the first and second embodiments, the ultrasonic image which is an image processing object may be not only a B-mode image but also a tomographic image including Tissue Harmonic Image (THI) or blood flow information.

Third Embodiment

The present embodiment has an additional configuration in which a user can select a value or a size of a structural element. Therefore, as shown in FIG. 1, an ultrasonic imaging device according to the present embodiment includes, for example, a User Interface (UI) unit in the control unit 40.

The UI unit displays a graphic UI (GUI) that allows user selection on the display unit 60, receives operation of a button or the like on the GUI by operating an input device such as a mouse, a keyboard, or a touch panel provided in the input unit 70, and determines processing of the image processing unit 30 according to a received user instruction.

An example of the GUI is shown in FIG. 12. In this example, a selection of whether to perform the morphology processing in the first embodiment or the second embodiment on the noise-removed image is received from a user. That is, a screen 600 of the display unit 60 includes an image display block 610 that displays an image, a parameter display block 620 that displays an imaging condition or parameter, and a reception unit 630 that displays a button which can be operated by the user. For example, when the image display block 610 displays a B-mode image after noise removal, the user may determine that information sufficient for diagnosis is obtained from the image, or that no further image processing is needed. In this case, the user operates the ON and OFF button for the edge enhancement processing displayed in the reception unit 630 to "OFF". When the user determines that the edge enhancement processing is needed, the edge enhancement processing is set to "ON". Accordingly, the morphology processing unit 33 performs the morphology processing based on, for example, the first embodiment on the noise-removed image, and a result image of the morphology processing is displayed on the image display block 610. At this time, the noise-removed image before the processing and an image after the processing may be displayed side by side.

Further, an adjustment dial or an adjustment bar that adjusts a level of "smoothing" may be provided, and the structural element size may be adjusted according to a received level of smoothing. In this case, a result of the morphology processing performed using the adjusted structural element size may be displayed alone or together with the noise-removed image before the processing on the image display block 610.

According to the present embodiment, the user can increase a freedom degree of the processing, and more appropriate image processing can be performed by comparing an adjustment degree before and after the edge enhancement processing.

Fourth Embodiment

In the present embodiment, the configuration of the image processing unit according to each embodiment described above is particularly applicable to an ultrasonic imaging device that inserts a puncture needle into an inspection object and images a support image that guides a path of the puncture needle.

In the ultrasonic imaging device that displays a biological tissue and a puncture device on a screen, although the puncture needle is visually recognized by being depicted as a point having a relatively high luminance than a biological tissue on an ultrasonic image, the puncture needle punctured into a living body may not be sufficiently visually recognized because a reflected wave from the needle returns in a direction different from a direction of an incident wave. Therefore, when puncturing is performed under an ultrasonic guide, an ultrasonic image, in which an edge component of the puncture needle is sharpened after the speckle noise is reduced, is obtained by applying, to the input image, noise removal and edge enhancement by an adaptive structural element using a result of the noise removal.

That is, the ultrasonic imaging device in the fourth embodiment is an ultrasonic imaging device that images a support image which guides a path of a puncture needle. The ultrasonic imaging device includes an ultrasonic measurement unit that transmits ultrasonic to an inspection object, receives ultrasonic which is a reflected wave, and acquires an ultrasonic signal, an image generation unit that generates an ultrasonic image of the inspection object using the ultrasonic signal acquired by the ultrasonic measurement unit, and an image processing unit that processes the ultrasonic image created by the image generation unit. The image processing unit includes a noise removing unit that removes a noise in the ultrasonic image created by the image generation unit, a morphology processing unit that performs a morphology processing on a noise-removed image generated by the noise removing unit, and a structural element determining unit that determines a value of a structural element used in a morphology processing by using the noise-removed image. The image processing unit generates a support image in which a boundary between the puncture needle and tissues other than the puncture needle is enhanced.

Configurations of the ultrasonic measurement unit, the image generation unit, and the image processing unit (the noise removing unit, the morphology processing unit, and the structural element determining unit) are the same as corresponding elements of the ultrasonic imaging device in the first embodiment, and a flow of an image processing is similar to the flow described in FIG. 4. The image processing unit may include the size determining unit 39 (FIG. 9) that determines a size of a structural element according to an imaging condition (image resolution or sampling interval), and in this case, the flow of the image processing is similar to the flow described in FIG. 10 or 11. If necessary, processing such as a known puncture needle enhancement processing using a direction dependent smoothing processing or the like may be added.

According to the fourth embodiment, it is possible to provide an ultrasonic image in which the edge component of the puncture needle is sharpened and to improve visibility of the needle at the time of puncturing by applying the image processing of the invention to an ultrasonic imaging device for supporting a puncturing guide.

Although embodiments of the ultrasonic imaging device and the image processing method of the invention have been described above, some elements described in the embodiments may be omitted or a known configuration may be added to the invention.

REFERENCE SIGN LIST

100: ultrasonic imaging device
10: ultrasonic measurement unit
20: image generation unit
30: image processing unit
31: noise removing unit
32: coordinate converting unit 33: morphology processing unit
33A: first calculation unit
33B: second calculation unit
35: structural element determining unit
37: synthesizing unit
39: size determining unit
40: control unit
50: storage unit
60: display unit
70: input unit
80: ultrasonic probe

The invention claimed is:

1. An ultrasonic imaging device comprising:
an ultrasonic measurement unit that transmits ultrasonic to an inspection object, receives ultrasonic which is a reflected wave, and acquires an ultrasonic signal;
an image generation unit that generates an ultrasonic image of the inspection object using the ultrasonic signal acquired by the ultrasonic measurement unit; and
an image processing unit that processes the ultrasonic image created by the image generation unit, wherein
the image processing unit includes a noise removing unit that removes a noise of the ultrasonic image, a morphology processing unit that performs a morphology processing on a noise-removed image generated by the noise removing unit, and a structural element determining unit that determines a value of a structural element used in the morphology processing by using the noise-removed image.

2. The ultrasonic imaging device according to claim 1, wherein
the morphology processing unit includes a first calculation unit that performs at least one of dilation and erosion using a first structural element, and a second calculation unit that performs at least one of opening and closing using a second structural element, and
the structural element determining unit determines a value of the second structural element by using the noise-removed image.

3. The ultrasonic imaging device according to claim 2, wherein
the structural element determining unit determines the value of the second structural element according to a difference between an image subjected to a dilation processing and an image subjected to an erosion processing by the first calculation unit.

4. The ultrasonic imaging device according to claim 2, wherein
the first calculation unit performs dilation and erosion using the first structural element,
the second calculation unit performs closing using the second structural element to a result of dilation using the first structural element, and performs opening to a result of erosion using the first structural element, and
the morphology processing unit adds, to the noise-removed image, a difference between a result of closing using the second structural element and a result of closing using the first structural element and a difference between a result of opening using the second structural element and a result of opening using the first structural element, and generates a morphology processed image.

5. The ultrasonic imaging device according to claim 1, wherein
the noise removing unit performs noise removal using an edge-preserving smoothing filter.

6. The ultrasonic imaging device according to claim 1, further comprising:
a coordinate converting unit that converts coordinates of the ultrasonic image from polar coordinates to Cartesian coordinates, wherein
the coordinate converting unit performs a coordinate conversion on an ultrasonic image before processing by the morphology processing unit.

7. The ultrasonic imaging device according to claim 1, further comprising:
a coordinate converting unit that converts coordinates of the ultrasonic image from polar coordinates to Cartesian coordinates, wherein
the coordinate converting unit performs a coordinate conversion on an ultrasonic image after processing by the morphology processing unit.

8. The ultrasonic imaging device according to claim 1, wherein
the image processing unit further includes a size determining unit that determines a size of the structural element.

9. The ultrasonic imaging device according to claim 8, wherein
the size determining unit determines the size of the structural element based on a resolution and a sampling interval of an ultrasonic image.

10. The ultrasonic imaging device according to claim 9, wherein
the image processing unit further includes a storage unit that stores a table showing a relationship between an imaging condition of an ultrasonic measurement and a resolution of an ultrasonic image, and
the size determining unit determines the size of the structural element by referring to the table stored in the storage unit.

11. The ultrasonic imaging device according to claim 8, wherein
the size determining unit determines the size of the structural element at each pixel position of an ultrasonic image.

12. The ultrasonic imaging device according to claim 8, wherein
the size determining unit calculates the size of the structural element at each pixel position of an ultrasonic image, and determines any one of a maximum value, a minimum value, and an average value of the calculated size as the size of the structural element.

13. The ultrasonic imaging device according to claim 1, further comprising:
a user interface unit that receives a selection of processing performed by the morphology processing unit.

14. An ultrasonic imaging device that inserts a puncture needle into an inspection object and images a support image that guides a path of the puncture needle, the ultrasonic imaging device comprising:
an ultrasonic measurement unit that transmits ultrasonic to the inspection object, receives ultrasonic which is a reflected wave, and acquires an ultrasonic signal;
an image generation unit that generates an ultrasonic image of the inspection object using the ultrasonic signal acquired by the ultrasonic measurement unit; and
an image processing unit that processes the ultrasonic image created by the image generation unit, wherein
the image processing unit
includes a noise removing unit that removes a noise of the ultrasonic image created by the image generation unit, a morphology processing unit that performs a morphology processing on a noise-removed image generated by the noise removing unit, and a structural element determining unit that determines a value of a structural element used in the morphology processing unit by using the noise-removed image, and generates the support image in which a boundary between the puncture needle and tissues other than the puncture needle is enhanced.

15. An image processing method for processing an ultrasonic image generated by using an ultrasonic signal received by an ultrasonic imaging device, the image processing method comprising:

removing a noise of the ultrasonic image;

performing a morphology processing on a noise-removed image; and determining a value of a structural element used in the morphology processing by using the noise-removed image, wherein the morphology processing includes at least one of dilation and erosion using a first structural element and opening and closing using a second structural element, and determines a value of the second structural element by a difference between an image after the dilation and an image after the erosion.

16. The image processing method according to claim 15, further comprising:

converting coordinates of the ultrasonic image from polar coordinates to Cartesian coordinates before noise removal or the morphology processing.

17. The image processing method according to claim 15, further comprising:

converting coordinates of the ultrasonic image from polar coordinates to Cartesian coordinates after the morphology processing.

18. The image processing method according to claim 15, further comprising:

determining a size of a structural element used in the morphology processing.

19. The image processing method according to claim 18, wherein when determining the size of the structural element, the size is determined by using a resolution and a sampling interval of the ultrasonic image.

* * * * *